United States Patent
Rowley

[19]

[11] Patent Number: 6,061,932
[45] Date of Patent: May 16, 2000

[54] STEERABLE UNDERWATER PLOW WITH MOVABLE BODY MEMBER

[75] Inventor: Steven R. Rowley, Stuart, Fla.

[73] Assignee: Coflexip Stena Offshore, Paris, France

[21] Appl. No.: 09/069,612

[22] Filed: Apr. 29, 1998

[51] Int. Cl.[7] .................................................. E02F 5/18
[52] U.S. Cl. .............................. 37/309; 37/313; 405/161; 405/181
[58] Field of Search .................................. 405/159, 160, 405/161, 162, 163, 164, 165, 166, 175, 181; 37/309, 312, 313, 342, 367, 370, 372; 172/324

[56] References Cited

U.S. PATENT DOCUMENTS

| | | |
|---|---|---|
| 2,756,654 | 7/1956 | Porterfield, Jr. et al. . |
| 3,024,851 | 3/1962 | Harres . |
| 3,140,745 | 7/1964 | Hinkle et al. . |
| 3,232,358 | 2/1966 | Heiberg .................................. 172/742 |
| 3,431,741 | 3/1969 | Kinnan . |
| 3,454,285 | 7/1969 | Van Peursem . |
| 3,571,956 | 3/1971 | Heiberg . |
| 3,788,085 | 1/1974 | Holberg . |
| 3,824,798 | 7/1974 | Shiroyama et al. . |
| 4,011,727 | 3/1977 | Suzuki et al. . |
| 4,069,679 | 1/1978 | Manley, Jr. . |
| 4,106,335 | 8/1978 | Shatto . |
| 4,141,667 | 2/1979 | Brown . |
| 4,162,087 | 7/1979 | Avrillon . |
| 4,208,813 | 6/1980 | Latimer . |
| 4,249,324 | 2/1981 | Latimer . |
| 4,312,144 | 1/1982 | Ezoe . |
| 4,314,414 | 2/1982 | Reynolds et al. . |
| 4,329,793 | 5/1982 | Reece . |
| 4,384,415 | 5/1983 | Brown et al. . |
| 4,395,158 | 7/1983 | Brooks . |
| 4,410,297 | 10/1983 | Lynch . |
| 4,428,132 | 1/1984 | Reece . |
| 4,447,173 | 5/1984 | Schultz et al. . |
| 4,488,836 | 12/1984 | Cour . |
| 4,538,937 | 9/1985 | Lynch . |
| 4,585,372 | 4/1986 | Grinsted et al. . |
| 4,655,639 | 4/1987 | Reece . |
| 4,664,553 | 5/1987 | Grinsted et al. . |
| 4,759,138 | 7/1988 | Grinsted . |
| 4,802,793 | 2/1989 | Grinsted et al. . |
| 4,892,443 | 1/1990 | Kunze et al. . |
| 4,986,697 | 1/1991 | Lynch . |
| 5,639,185 | 6/1997 | Saxon . |

FOREIGN PATENT DOCUMENTS

| | | |
|---|---|---|
| 144099 | 6/1985 | European Pat. Off. . |
| 0 185 422 | 6/1986 | European Pat. Off. . |
| 221581 | 5/1987 | European Pat. Off. . |
| 185422 | 6/1988 | European Pat. Off. . |
| 1107641 | 1/1956 | France . |
| 7220922 | 1/1973 | France . |
| 3245626 A1 | 7/1983 | Germany . |
| 2029182 | 3/1980 | United Kingdom . |
| 2285821 | 7/1985 | United Kingdom . |

*Primary Examiner*—Robert E. Pezzuto
*Attorney, Agent, or Firm*—Quarles & Brady LLP

[57] ABSTRACT

A steerable plow configured for towing in a direction along a seabed comprises a body and a soil cutting member slidingly connected to the body. The soil cutting member defines a cutting vane for cutting a trench in the seabed. The body includes two skids and a cross member spanning the two skids. The skids are spaced apart from each other and from the soil cutting member to stabilize the plow. A motive element is included to move the soil cutting member relative to the body, and a steering control receives commands from a remote location to control the motive element. At least one towing member is included to attach the plow to a tow cable.

18 Claims, 7 Drawing Sheets

STEERABLE UNDERWATER PLOW WITH MOVABLE BODY MEMBER

CROSS REFERENCE TO RELATED APPLICATIONS (Not Applicable)

STATEMENT REGARDING FEDERALLY SPONSORED RESEARCH OR DEVELOPMENT (Not Applicable)

FIELD OF THE INVENTION

This invention relates to plows. More particularly, this invention relates to a new and improved steerable underwater plows for trenching and cable laying operations.

BACKGROUND OF THE INVENTION

There are commonly known a wide variety of conventional plows which are capable of operating underwater for trenching and pipe laying operations on a seabed. As used herein, the term seabed shall include the bottom of any body of water including for example, a lake, river or ocean. Typically, such plows include a share or some other type of soil cutting device for forming a trench and are dragged behind a tow vehicle, such as a ship or submarine tractor, by means of a suitable cable. For a variety of reasons, including avoidance of undersea obstacles, the path required to be plowed is often circuitous, including numerous changes in direction.

There are two basic methods by which the plow direction can be varied. The simplest approach, particularly in the case of plows which are dragged behind a tow vehicle, is to vary the direction of the tow vehicle so that the towing direction exerted on the plow by its cable causes the plow to follow a new path. However, this crude "tow and follow" method of controlling the plow direction has several disadvantages including a certain amount of difficulty in maintaining precise control over the path of the plow. This can present a particular problem where it is necessary to position a pipeline or cable with some accuracy along a designated course. As an improvement to the basic tow and follow system described above, systems have been devised which are comprised essentially of a plow towed by a long cable, split at the lowered end into a bridle whose tow ends are then attached to the plow. By differentially pulling on the two ends of the bridle, a turning moment is produced which slightly angles the plow share from its previous track, and causes a change in the plowing direction. By using a mechanism which always causes the centerline of the tow cable to pass through the plow's "center of resistance" (usually at the location of the soil cutting member), the differential force required to act on the bridle can be minimized. Various systems for achieving this result are disclosed in U.S. Pat. No. 4,759,138 to Grinsted. While such bridle control type systems are an improvement over more basic systems, they suffer from several problems. Most significantly, plows which establish an effective towing point located at the plow's center of resistance suffer a significant degree of straight line tracking instability, since the towing point tends to be located rearward relative to the front of the plow. This tracking instability is an undesirable side-effect of these types of steering system which must be designed to translate the relatively small steering forces imparted by the tow cable, to the plow. Such straight line tracking instability is an undesirable characteristic as it tends to cause the plow to veer off course under conditions where a straight trenching path is desired. Further, such plows tend to be rather complicated and are limited in the degree of precision which can be achieved due to the fact that the turning moment caused by the bridle control will be effected by the uncertain position of the long tow cable.

Others have attempted a more direct approach to steer an underwater plow. For example U.S. Pat. No. 4,329,793 to Reece discloses a plow having angular adjustable skids which have soil engaging blades. However, that system also has a serious disadvantage to the extent that the turning moment generated by the relatively small soil engaging blades may be insufficient to adequately control the plow direction, particularly where the soil conditions are soft and the trench to be cut is relatively deep. Moreover, the design disclosed in Reece also suffers from the straight line tracking instability problem described above, since the effective tow point is located toward the rear of the plow, above the center of resistance.

Thus, it is an object of the invention to provide a steerable underwater plow having exceptional straight line tracking capability. Further, it is another object of the invention to provide a plow having excellent maneuverability to accommodate trenching operations where frequent and substantial changes in plowing direction are required.

SUMMARY OF THE INVENTION

In accordance with the invention, these and other objects are accomplished by providing a steerable plow configured for towing in a direction along a seabed comprising a body and a soil cutting member slidingly connected to the body. A portion of the soil cutting member defines a cutting vane for cutting a trench in the seabed.

In one embodiment of the invention, the body includes two skids spanned by a cross member. The skids are connected to opposing ends of the cross member with skids supports. The skids are also spaced apart from each other and from the soil cutting member to stabilize the plow.

A motive element can be included to move the soil cutting member relative to the body. The movement of the soil cutting member relative to the body away from a position of steering equilibrium produces a turning moment which can be used to steer the plow. As the distance the soil cutting member moves away from the steering equilibrium increases, the turning moment also increases. If a motive element is included, a steering control can also be included to receive commands from a remote location and to control the motive element.

Additionally, at least one towing member can also be included with the plow so as to attach the plow to a tow cable. The tow cable is then dragged behind a tow vehicle, such as a ship or submarine tractor.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE PREFERRED EMBODIMENTS

Figure 1:
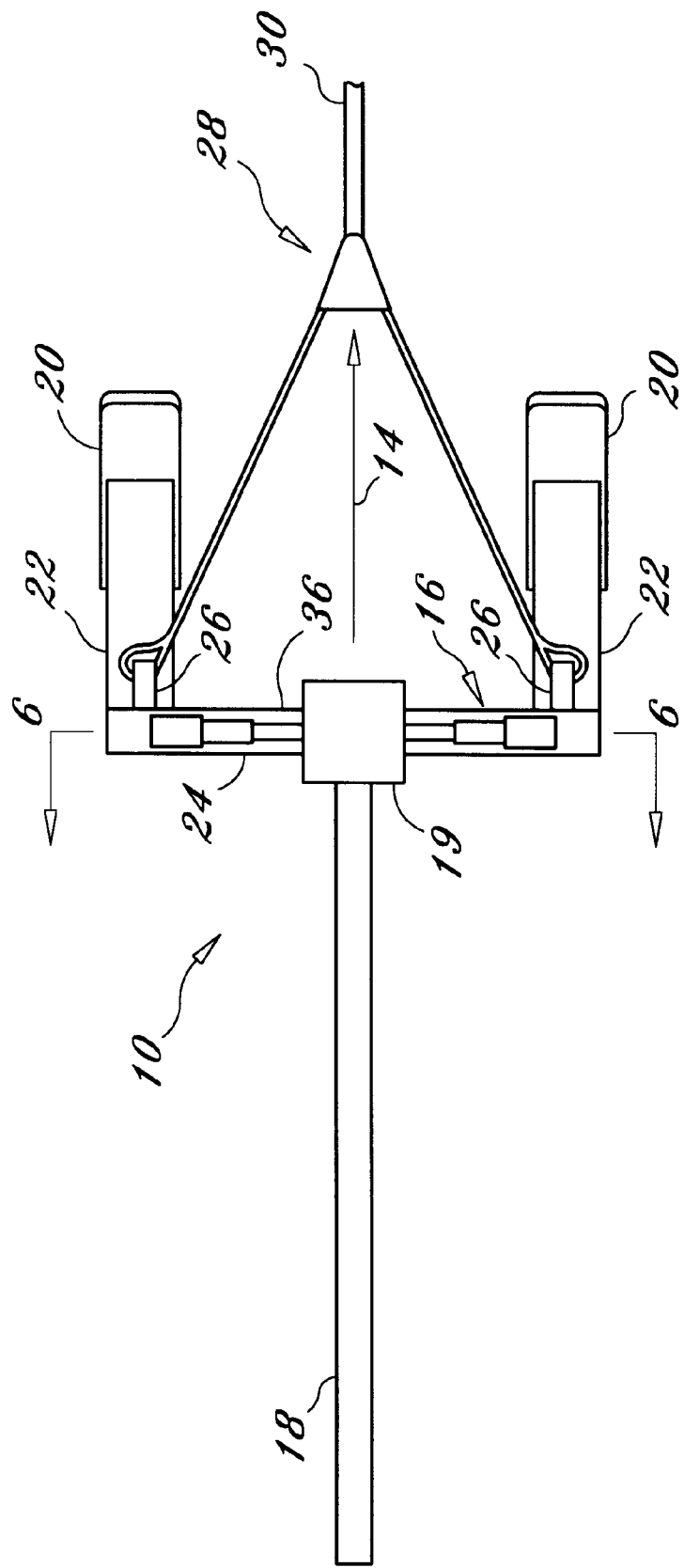
FIG. 1 is a top view of a steerable plow with a slidable soil cutting member.
Figure 2:
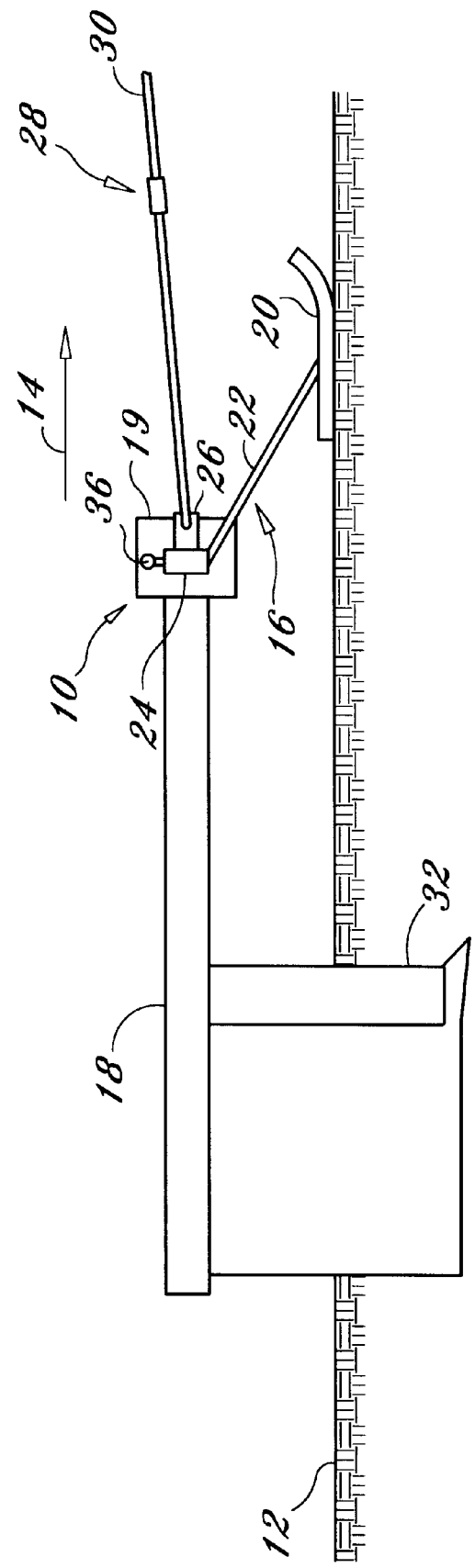
FIG. 2 is a side view of the steerable plow in FIG. 1.
Figure 3:
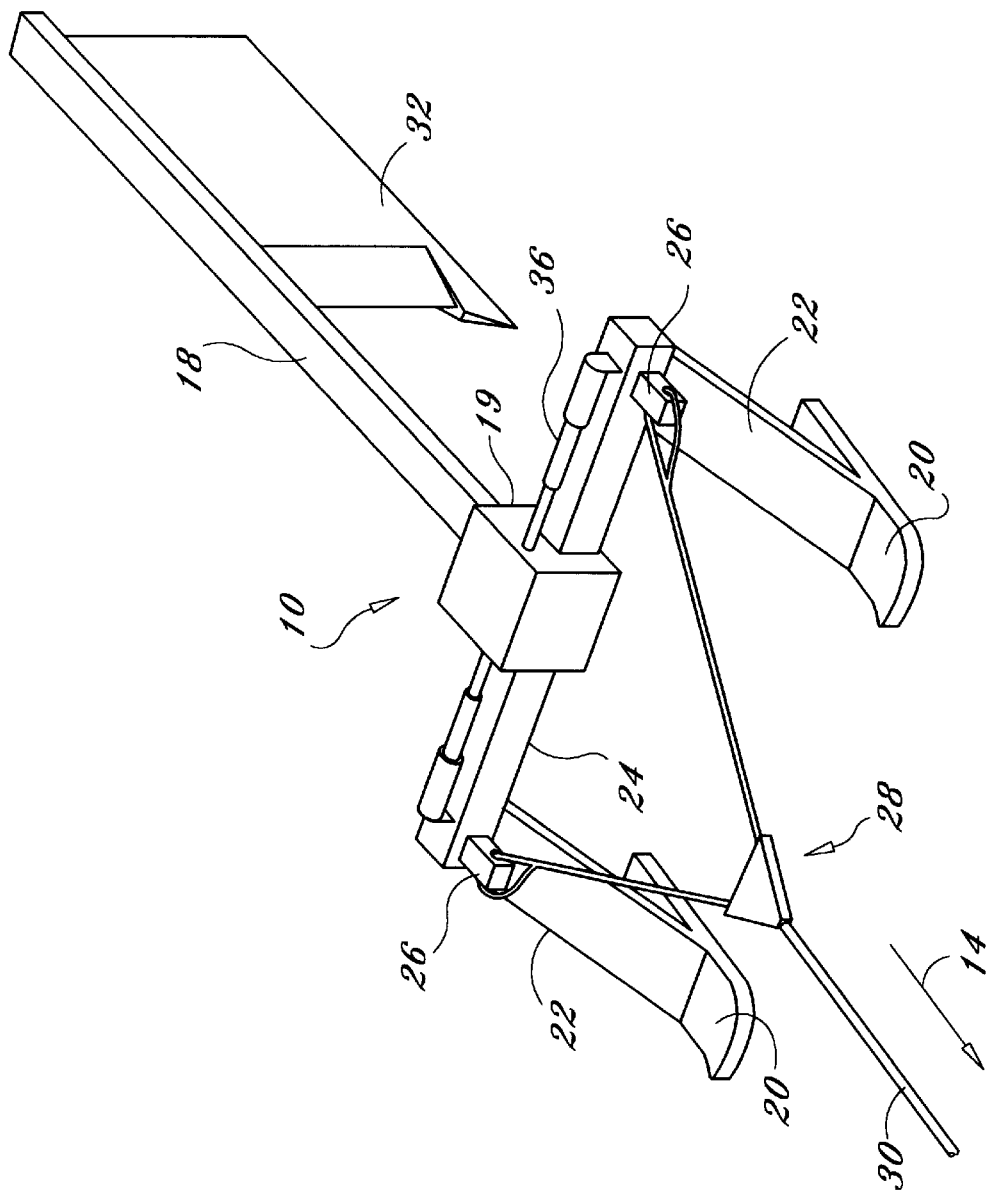
FIG. 3 is a perspective view of the steerable plow in FIG. 1.

FIGS. 1, 2 and 3 illustrate a steerable plow according to the invention. The steerable plow 10 is configured for underwater towing along a seabed 12 and also configured for forming a trench in the seabed 12 in a travel direction 14. The plow 10 comprises a body 16 and a rigid soil cutting member 18 slidingly attached to the body 16. Any means of slidingly attaching the soil cutting member 18 to the body 16 can be used. The presently preferred means, as shown in FIGS. 1–3, is a channel in a head 19 of the soil cutting member 18 through which a portion of the body 16 passes. No particular channel shape is required in head 19, provided that it securely engages the body 16. Thus, for example, the channel in head 19 may be rectangular, t-shaped or dove-tail shaped as may be preferred in order to more effectively secure the head 19 to the cross member 24 of the body 16. Also, the channel in the head 19 may be designed to receive the entire cross-member 24, or only a portion thereof. Another example of such a means is a slot in the body 16 through which the soil cutting member 18 passes.

The body 16 preferably includes one or more contact surfaces with which the body 16 engages the surface of the seabed 12. These contact surfaces help support the weight of the plow 10 and also act to stabilize the plow 10. The presently preferred one or more contact surfaces are two skids 20. The skids 20 are preferably spaced apart from the soil cutting member 16 and horizontally spaced apart from each other to provide both lateral and horizontal support for the plow 10. The skids 20 are mounted with skid supports 22 on opposing ends of a cross member 24 spanning the skids 20. While skids are presently preferred for contact surfaces, it will be appreciated by those skilled in the art any other suitable structure may also be used for this purpose.

The plow 10 preferably includes towing members 26 which define hitch points for a bridle 28. The bridle 28 is attached to a tow cable 30 which extends to a ship or underwater tractor (not shown). The force exerted by the ship, underwater tractor or other source on the tow cable 30 and transferred to the bridle 28 pulls the plow 10 through the seabed 12.

As shown in FIG. 2, a portion of the soil cutting member 18 defines a cutting vane 32 which is preferably fixed relative to the soil cutting member 18. The cutting vane 32 is configured to cut through the seabed 12 so as to form a trench. The depth of the trench is in part a function of the weight of the soil cutting member 18 and the vertical difference in length between the bottom of the cutting vane 32 and the bottom of the skid 20.

Significantly, the towing members 26 define an effective tow point which is forward relative to the plow's center of resistance defined by the soil cutting member 16. This arrangement results in a substantial improvement in straight line tracking capability as compared to conventional steerable plows. In conventional steerable plows, the effective tow point is designed to be at or near the center of resistance in order to most effectively utilize the relatively small steering forces transmitted to the plow by the tow cable. In such plows, straight line stability is necessarily sacrificed. Moreover, complex mechanical systems are often required to translate the actual tow point at the front of the plow to an effected tow point, located over the cutting vane 32, in order to achieve effective results. By comparison, the steering arrangements disclosed herein provide very powerful steering forces independent of the tow cable 30, and therefore avoid the need to position the effective tow point at or near the plow's center of resistance.

As previously stated, steering forces that result in a turning moment are not created by movement of the tow cable 30 relative to the plow 10. Instead, lateral movement of the soil cutting member 18 relative to the body 16 creates the turning moment on the body 16.

Figure 5B:
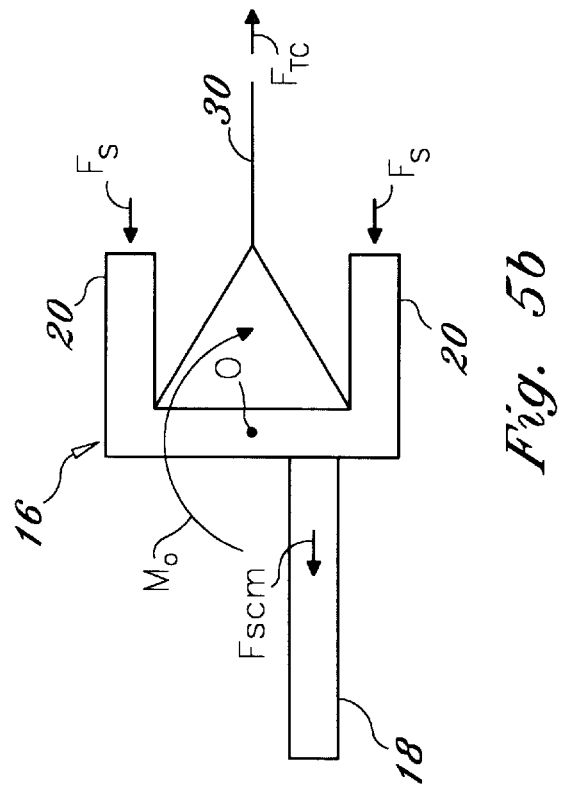
FIG. 5b is a diagrammatic view of the forces acting on the steerable plow in FIG. 4.
Figure 5A:
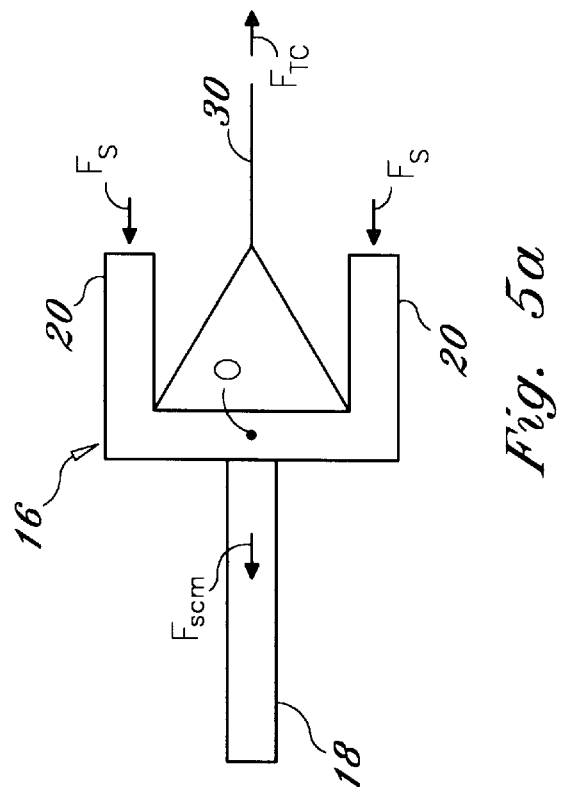
FIG. 5a is a diagrammatic view of the forces acting on the steerable plow in FIG. 1.

FIG. 1 illustrates the plow 10 in a position of steering equilibrium, and FIG. 5a is a force diagram of FIG. 1. When the plow 10 is in a position of steering equilibrium, the soil cutting member force $F_{SCM}$ and the tow cable force $F_TC$ are in line with the origin point O that is centered laterally along the body 16. The turning moment $M_O$ about the origin point O is calculated by summing the forces acting on the plow 10 multiplied by the perpendicular distances between the forces and the origin point O. However, in the equilibrium position, there is no perpendicular distance between the origin point O and either the soil cutting member force $F_{SCM}$ or the tow cable force $F_{TC}$; and thus, the turning moment $M_O$ resulting from those forces is zero. The skid forces $F_S$ are laterally equidistant from the origin point O; and thus, the turning moment $M_O$ created by the skid forces $F_S$ is zero, assuming the skid forces $F_S$ are equal. Therefore, when the plow 10 is in a position of steering equilibrium, the turning moment $M_O$ acting on the plow 10 is zero.

Figure 4:
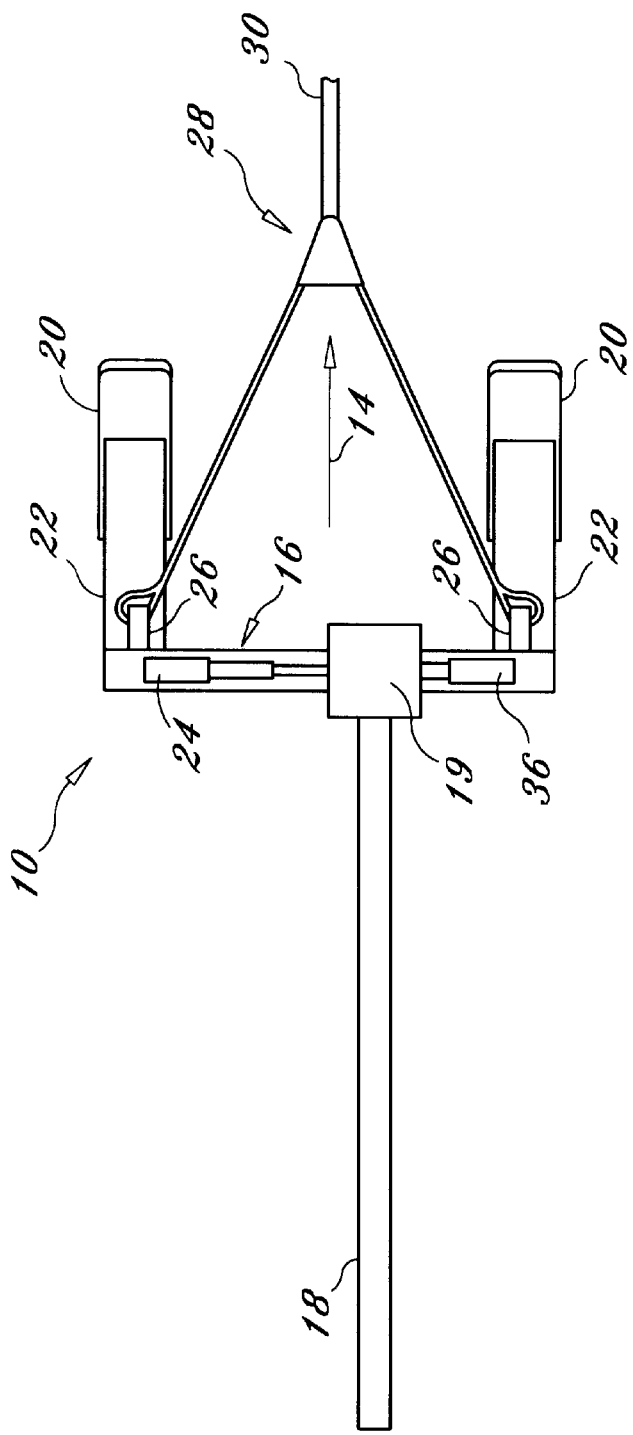
FIG. 4 is a top view of a steerable plow with the soil cutting member slid to the right.

FIG. 4 illustrates the plow 10 in a position of steering non-equilibrium, and FIG. 5b is a force diagram of FIG. 4. Anytime the soil cutting member 18 moves laterally in either direction away from the equilibrium position, as shown in FIG. 1, a turning moment $M_O$ is created. Although the turning moment $M_O$ created by the 5 skid forces $F_S$ and the tow cable force $F_TC$ is still zero, a turning moment $M_O$ is created because the soil cutting member force $F_{SCM}$ is no longer in line with the origin point O. The turning moment $M_O$ is the soil cutting member force $F_{SC}M$ multiplied by the perpendicular distance between the soil cutting member force $F_{SCM}$ and the origin point O. From this equation it is evident that as the centerline of the soil cutting member 18 moves farther away from the origin point O the turning moment $M_O$ becomes larger. Thus, if a smaller radius turn is desired, the soil cutting member 18 must be moved farther away from the origin point O, and conversely, if a larger radius turn is desired, the soil cutting member must be moved closer to the origin point O.

The direction of the turning moment $M_O$ shown in FIG. 5b is a clockwise. If the soil cutting member 18 was to move to the opposite side of the origin point O, the direction of the turning moment $M_O$ would be counterclockwise.

A motive element is preferably included to move the soil cutting member 18 relative to the body 16. FIGS. 1–4 and 6 illustrate the presently preferred motive element as being hydraulic cylinders 36 that drive the soil cutting member 18 in both directions along the cross member 24. Hydraulic lines, not shown for clarity, feed each cylinder 36. When the soil cutting member 18 is to be moved in one direction, hydraulic fluid is fed into one cylinder 36 and removed from the other cylinder 36 so as to create a pressure differential against the head 19 which causes movement of the soil cutting member 18 relative to the cross member 24. Pneumatic cylinders can also be used for the motive element. However, they are not preferred in this application since they would tend to be more difficult to work with and would provides less accurate control due to the ambient pressure differentials likely to be experienced by the unit.

Figure 6:
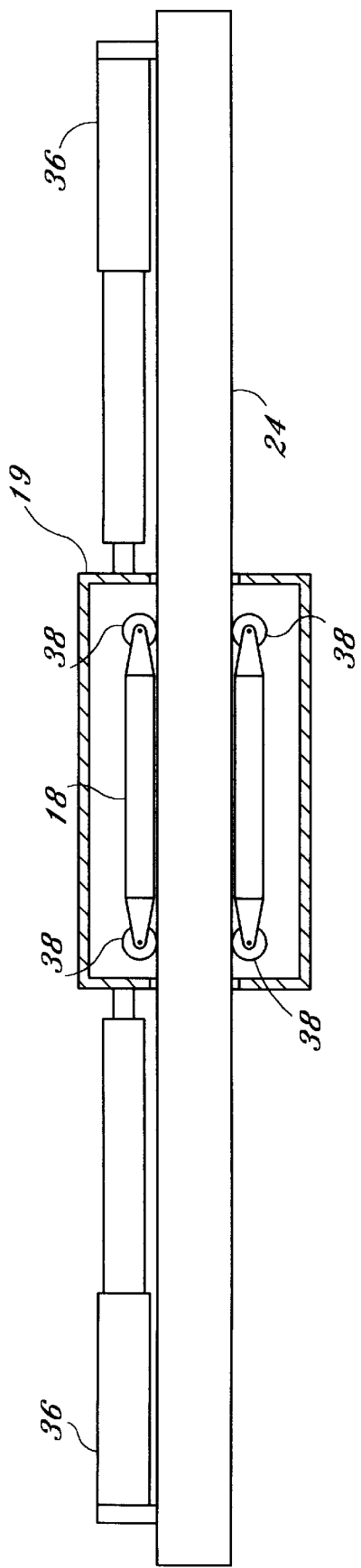
FIG. 6 is a cross section taken along line 6—6 in FIG. 1.

Also shown in FIG. 6 are rollers 38 that are presently preferred to allow the soil cutting member 18 to slidingly move relative to the cross member 24. It will be appreciated by those skilled in the art that numerous other configurations are possible for achieving this sliding engagement, and the invention is not intended to be limited to the precise arrangement shown.

Figure 7:
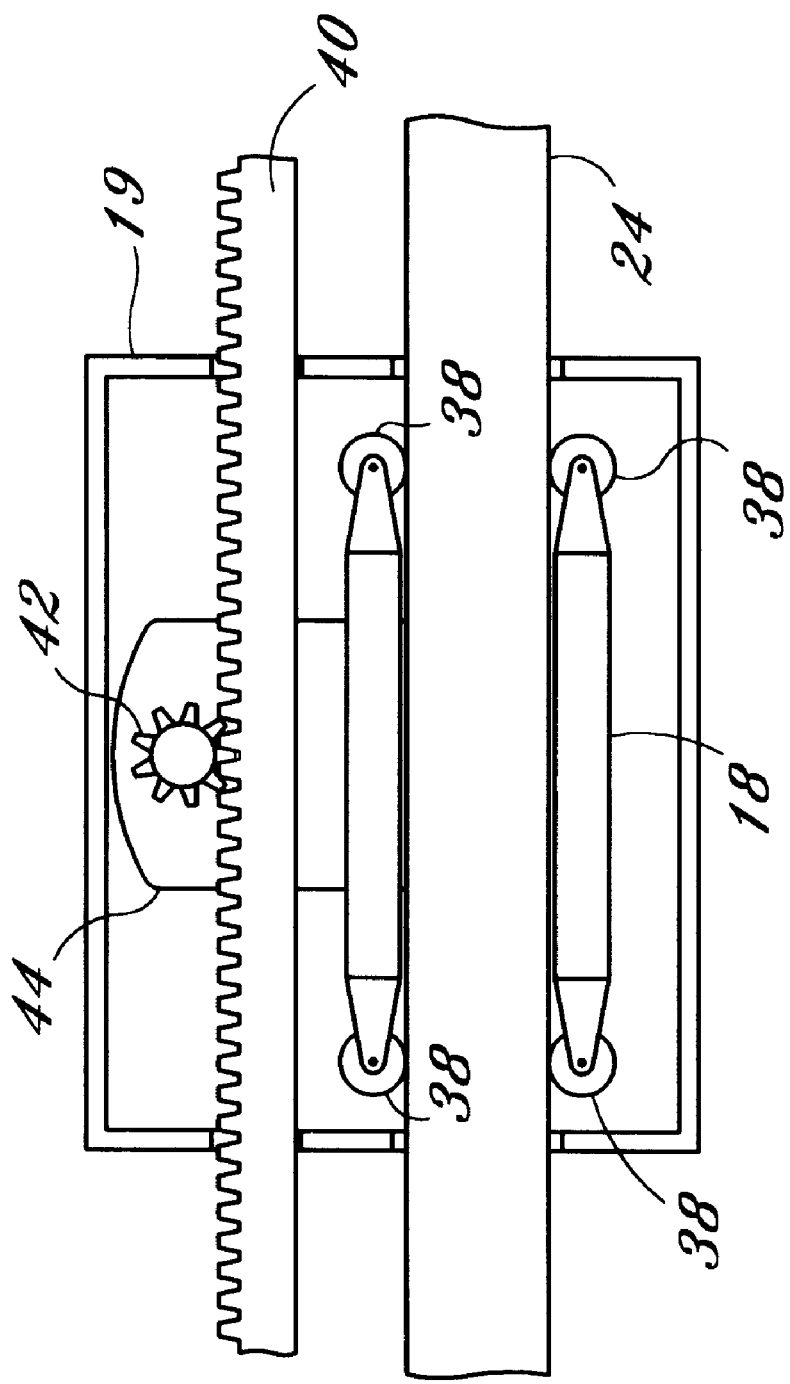
FIG. 7 is a front elevation, partially in section, of an alternative embodiment of a motive element.

FIG. 7 illustrates an alternative example of a motive element for use with the invention. With this alternative, a toothed bar 40 is driven by a gear 42 connected to a hydrauliic or electric motor 44. The motor 44 is attached to the soil cutting member 18, and the toothed bar 40 is attached to the cross member 24. Thus, when the gear 42 moves the toothed bar 40 as the electric motor 44 is being operated, the soil cutting member 18 moves relative to the cross member 24. It will be appreciated that many other types of motive elements can also be used to move one structure relative to another structure in an underwater environment and are well known in the art, and all are potentially suitable for this purpose.

A steering control unit is also preferably included for the underwater plow 10. In the presently preferred embodiment, the steering control unit is included within the head 19. However, the invention is not limited in this regard and those skilled in the art will recognize that the steering control unit could also be mounted on the cross member 16 or on some other part of the soil cutting member 18. The steering control unit is preferably configured for receiving a steering command from a remote location and controlling the motive element 36, 44. Alternatively, the steering control unit may include an appropriate internal guidance system capable of allowing the plow 10 to follow a predetermined, pre-programmed path. In either case, the steering control unit preferably includes sensing means for sensing the distance the soil cutting member 18 moves relative to the origin point O. In a preferred embodiment, the steering control unit is comprised of a programmable computer to aid in the proper positioning of the cutting vane 32 or soil cutting member 18 so as to cause a desired response to a particular steering command, or as an aid to achieving a particular trenching path.

What is claimed is:

1. A steerable plow configured for towing in a direction along a seabed, comprising:

a body for supporting a portion of said plow on the seabed;

a soil cutting member; and, a motive element for slidingly connecting said soil cutting member to said body, said motive element transferring to said body steering forces generated by said soil cutting member to thereby steer the plow, said soil cutting member sliding laterally along said body transverse to said direction.

2. A steerable plow according to claim 1, wherein at least a portion of said soil cutting member defines a cutting vane.

3. A steerable plow according to claim 1, further comprising a motive element for sliding said soil cutting member along said body.

4. A steerable plow according to claim 3, further comprising steering control means for receiving a steering command from a remote location and controlling said motive element.

5. A steerable plow according to claim 3, wherein said motive element is a hydraulic motor.

6. A steerable plow according to claim 3, wherein said motive element is a hydraulic cylinder.

7. A steerable plow according to claim 3, wherein said motive element is a pneumatic piston.

8. A steerable plow according to claim 3, wherein said motive element is an electric motor.

9. A steerable plow according to claim 1, further comprising at least one skid attached to said body for engaging a surface of said seabed, said at least one skid spaced apart from said soil cutting member.

10. A steerable plow according to claim 1, wherein said body comprises two skids and a cross member spanning said two skids, said soil cutting member being slidingly connected to said cross member and said two skids spaced apart from said soil cutting member.

11. A steerable plow according to claim 1, further comprising at least one towing member for attaching said plow to a tow cable, said at least one towing member disposed forward relative to a center of resistance of said soil cutting member.

12. A steerable plow configured for towing in a direction along a seabed, comprising:

two skids spaced apart one from the other for engaging a surface of said seabed;

a cross member spanning said two skids;

a soil cutting member slidingly connected to said cross member;

at least a portion of said soil cutting member defining a cutting vane; and, a motive element for sliding said soil cutting member along said cross member transverse to said direction, said motive element transferring to said cross member steering forces generated by said soil cutting member to thereby steer the plow.

13. A steerable plow according to claim 12, further comprising steering control means for receiving a steering command from a remote location and controlling said motive element.

14. A steerable plow according to claim 12, wherein said motive element is a hydraulic motor.

15. A steerable plow according to claim 12, wherein said motive element is a hydraulic piston.

16. A steerable plow according to claim 12, wherein said motive element is a pneumatic piston.

17. A steerable plow according to claim 12, wherein said motive element is an electric motor.

18. A steerable plow according to claim 12, further comprising at least one towing member for attaching said plow to a tow cable, said at least one towing member disposed forward relative to a center of resistance of said soil cutting member.

* * * * *